(12) United States Patent
Durack

(10) Patent No.: US 9,599,218 B2
(45) Date of Patent: Mar. 21, 2017

(54) MODULATED CLAMPING FORCE GENERATOR FOR TOROIDAL CVT

(71) Applicant: ULTIMATE TRANSMISSIONS PTY LTD, Strathfield, NSW (AU)

(72) Inventor: Michael Durack, Nobby (AU)

(73) Assignee: Ultimate Transmissions Pty Ltd, Strathfield, NSW (AU)

( * ) Notice: Subject to any disclaimer, the term of this patent is extended or adjusted under 35 U.S.C. 154(b) by 0 days.

(21) Appl. No.: 14/421,617

(22) PCT Filed: Aug. 16, 2013

(86) PCT No.: PCT/AU2013/000906
§ 371 (c)(1),
(2) Date: Feb. 13, 2015

(87) PCT Pub. No.: WO2014/026238
PCT Pub. Date: Feb. 20, 2014

(65) Prior Publication Data
US 2015/0211632 A1    Jul. 30, 2015

(30) Foreign Application Priority Data

Aug. 16, 2012   (AU) ................. 2012903525

(51) Int. Cl.
*F16H 15/38*    (2006.01)
*F16H 61/664*   (2006.01)

(52) U.S. Cl.
CPC ......... *F16H 61/6649* (2013.01); *F16H 15/38* (2013.01)

(58) Field of Classification Search
CPC ....................... F16H 61/6649; F16H 15/38
See application file for complete search history.

(56) References Cited

U.S. PATENT DOCUMENTS 2,595,367 A    5/1952   Picanol
3,430,504 A *  3/1969   Dickenbrock ........ F16H 61/664
                                                        476/42

(Continued)

FOREIGN PATENT DOCUMENTS

WO    2011041851    4/2011
WO    2012151615    11/2012

OTHER PUBLICATIONS

International Search Report mailed on Oct. 18, 2013 in International Application No. PCT/AU2013/000906. (3 pages).

*Primary Examiner* — David M Fenstermacher
(74) *Attorney, Agent, or Firm* — Shutts & Bowen LLP

(57) ABSTRACT

A toroidal variable speed traction drive is provided. The drive comprises a driving toroidal disc assembly (4) and a driven toroidal disc assembly (3). The toroidal disc assemblies (3, 4) have a common axis of rotation. A plurality of roller assemblies are interposed between the toroidal discs (3, 4). Each roller assembly comprises at least one roller (16). The toroidal discs (3, 4) are urged together against the interposed roller assemblies by an axially directed clamping force. Each roller (16) of each roller assembly contacts each toroidal disc (3, 4) at contact points. The driving toroidal disc assembly (4) is driven by an input drive shaft (14) which provides an input torque. The driven toroidal disc (3) drives an output structure (5), that rotates around the common axis of rotation, the output structure (5, 12) driving an output shaft (13). An interposed clamping arrangement (1, 5) is provided between the driven toroidal disc (3) and the output structure (5, 12), the interposed clamping arrangement (1, 5) provides the axially directed clamping force which is proportional to an output torque experienced by the output shaft (13).

19 Claims, 13 Drawing Sheets

(56) References Cited

U.S. PATENT DOCUMENTS

| | | | | |
|---|---|---|---|---|
| 5,214,973 | A | 6/1993 | Hambric | |
| 5,267,920 | A * | 12/1993 | Hibi | F16H 15/38 |
| | | | | 476/40 |
| 5,971,886 | A * | 10/1999 | Yamamoto | F16H 15/38 |
| | | | | 476/10 |
| 6,261,203 | B1 * | 7/2001 | Shimizuya | F16C 33/34 |
| | | | | 29/898.13 |
| 6,332,857 | B1 * | 12/2001 | Ishikawa | F16H 13/14 |
| | | | | 29/407.01 |
| 6,740,001 | B1 * | 5/2004 | Ishikawa | F16H 15/38 |
| | | | | 476/41 |
| 7,465,249 | B2 * | 12/2008 | Nishii | F16H 15/38 |
| | | | | 476/42 |
| 2002/0028723 | A1 * | 3/2002 | Hirano | F16H 15/38 |
| | | | | 476/42 |
| 2002/0068659 | A1 * | 6/2002 | Hirai | F16C 33/64 |
| | | | | 476/40 |
| 2002/0147069 | A1 * | 10/2002 | Ishikawa | F16H 15/38 |
| | | | | 476/42 |
| 2003/0190994 | A1 * | 10/2003 | Ishikawa | F16H 15/38 |
| | | | | 476/46 |
| 2012/0202644 | A1 * | 8/2012 | Durack | F16H 15/38 |
| | | | | 476/40 |
| 2013/0244827 | A1 * | 9/2013 | Katsumata | F16H 15/38 |
| | | | | 476/40 |

* cited by examiner

COMPARISON OF NORMAL FORCES CREATED BY INPUT
AND OUTPUT RAMPS AT ENGINE SPEED OF 4,000RPM

COMPARISON OF NORMAL FORCES CREATED BY INPUT
AND OUTPUT RAMPS AT ENGINE SPEED OF 6,000RPM

MODULATED CLAMPING FORCE GENERATOR FOR TOROIDAL CVT

CROSS REFERENCE TO RELATED APPLICATIONS

This application is a §371 national stage entry of International Application No. PCT/AU2013/000906, filed Aug. 16, 2013, entitled "MODULATED CLAMPING FORCE GENERATOR FOR TOROIDAL CVT," which claims priority to Australian Application No. AU 2012903525, filed Aug. 16, 2012, which are incorporated herein by reference in their entireties.

TECHNICAL FIELD

The present invention relates to continuously variable transmissions (CVT).

BACKGROUND OF THE INVENTION

Most CVT mechanisms rely on pressure to create a frictional force between one surface and another to transfer torque from one rotating member to another.

In the case of a Toroidal CVT, traction rollers are clamped between an input and output disc; while in the case of belt or chain CVTs belt segments are clamped between similar discs. In both cases tangential force is transferred from the clamped component (roller or belt segment) to and from the discs through a special Traction Fluid.

The Traction Fluid has the unique property of increasing its viscosity when under pressure. When under high pressure of 0.5 GPa this increase is of the order of 10,000 times while when under very high pressures of 2 GPa the increase is of the order of 1,000,000,000 times. The graph in FIG. 1 illustrates this pressure dependant relationship and also its corresponding relationship with temperature.

This high viscosity allows the fluids to transmit high shearing forces between two surfaces with only small differences in speed (creep) between the two surfaces when the contact pressure between the two surfaces is high. The limitation on how large these forces can be is related to the properties of the materials used in the rolling or translating elements, and the design life of the device.

The power density of a CVT using these fluids is directly related to the relationship of the allowed tangential force to the applied clamping force. This is most often referred to as the Traction Coefficient. The maximum Traction Coefficient is the highest ratio between the tangential force and the contact force and is typically less than 0.1. When the tangential force is greater than that defined by this upper limit the contact will start to slip excessively. The heat generated by this slip reduces the viscosity and the slip increases at an exponential rate. By using a higher Traction Coefficient more torque can be transferred; but above a certain level too much creep or slip will occur and the efficiency of the CVT will suffer. Most toroidal traction drives use a traction coefficient of around 0.06-0.07.

The clamping force must be high enough to transfer the tangential forces without excessive slipping, and the tangential force must never become great enough to cause a gross breakdown of the fluid film caused by excessive slip and accompanying excessive heating.

It is not generally accepted that the clamping force remain constant and large enough to manage the highest tangential forces that could be generated in the CVT. Normally some form of Ball Ramp device is placed in the input drive that is designed to generate a clamping force that is directly proportional to the input torque. This ensures that high contact forces are only present when high torque is passing through the CVT. This significantly extends the fatigue life of the components stressed by the clamping force and the life of the Traction Fluid.

These ball ramps are designed to convert the input torque (typically from an engine) to an axial or clamping force and are for this reason placed on the input side to the CVT.

However the quantum of the tangential forces generated within the toroidal CVT mechanism is both a function of the torque and the ratio position of the rollers. Typically, with the Ball Ramp mounted on the input side, the system is adequately clamped when in low gear (when tangential forces are high) but "over clamped" when the system is in high gear.

The detailed geometry of the rollers and discs also affect the degree of over- or under-clamping. The particular geometry of the half toroidal CVT (SHTV) is suited to an input mounted ball ramp as it becomes only slightly over clamped when in high and low gear.

Elimination of over-clamping will extend the life of a CVT and improve its efficiency.

Typical Ball Ramp

A typical Ball Ramp arrangement consists of two plates that are each machined with slots that face each other and trap a ball or roller. One plate is connected to the inputted rotating energy and the other to the system being rotated. The slots consist of two ramps so that when torque is applied to the "Input Ramp Disc" the ramps force the roller against the opposing ramp machined in the "Output Ramp Disc" and create a clamping force.

The quantum of the clamping force is defined by this equation:

$$CF = (T \times 1/r)/\TAN \theta$$

Where:
1. CF is the clamping force in Newtons
2. T is the input torque in Nm
3. r is the radial distance from the centreline of rotation to the centre of the roller or ball in meters
4. θ is the ramp angle in degrees In a typical CVT the amount of normal force required to transmit forces is given by this equation:

$$NF = TF/\mu$$

Where
1. NF is the normal force in N
2. TF is the tangential force at the point of contact in N that must be generated between the input disc and the roller belt or chain.
3. μ is the traction coefficient The use of a Ball Ramp with a Toroidal CVT is relatively simple and shown in FIG. 2. FIG. 3 depicts a similar arrangement using a roller supported on an axle that bears up against a single ramp. Because the toroidal discs do not move the clamping can be executed using only mechanical interactions, provided deflections are allowed for.

The angle of the ramp is arranged to provide the right clamping force to ensure no slip occurs at the contact of the Discs and Rollers.

As noted earlier, the correct angle is derived from the formula NF=TF/μ, with TF being the maximum tangential force, which in this arrangement occurs at low gear.

As the CVT changes ratio towards a higher gear the clamping force becomes more than is needed and the discs are effectively over clamped. Only in low gear is the Traction Coefficient operating at its preferred value. This behaviour is peculiar to toroidal traction drives, other traction drives such as those that use balls or discs like a kopp variator, are most suitable for application of an input clamping ball ramp.

It is possible to design a system that uses an additional piston that can be engaged or disengaged as the ratio changes giving a stepped reduction in clamping force.

With this two stage system it is important that any reversed torque (such as that occurring during engine braking) is very low; as when the torque reverses the relative tangential forces become greater in over drive (high gear) than in under-drive. This arrangement is fundamentally unsuitable for use in a flywheel based KERS as the reversing torques are very high. It is also unsuitable when used in a multi stage IVT when the variator is swept more than once through a full ratio change.

It is an object of the present invention to create a clamping system based on simple mechanical components to create as close to ideal normal clamping forces on the roller contact points in a traction based variator.

The invention can be applied to toroidal variators, both single and half, and to other forms of variator requiring control of clamping forces.

SUMMARY OF THE INVENTION

According to the present invention there is provided a toroidal variable speed traction drive comprising: a driving toroidal disc assembly and a driven toroidal disc assembly, the toroidal disc assemblies having a common axis of rotation; a plurality of roller assemblies interposed between the toroidal discs, each roller assembly comprising at least one roller; wherein the toroidal discs are urged together against the interposed roller assemblies by an axially directed clamping force, wherein each roller of each roller assembly contacts each toroidal disc at contact points; the driving toroidal disc assembly is driven by an input drive shaft which provides an input torque; the driven toroidal disc drives an output structure, that rotates around the common axis of rotation, the output structure driving an output shaft; wherein an interposed clamping arrangement is provided between the driven toroidal disc and the output structure, the interposed clamping arrangement provides the axially directed clamping force which is proportional to an output torque experienced by the output shaft.

In exemplary embodiments, the driving toroidal disc assembly is driven by an input structure, that rotates around the common axis of rotation, the input structure is driven by the input drive shaft; wherein a second interposed clamping arrangement is provided between the driving toroidal disc and the input structure, the second interposed clamping arrangement provides an axially directed clamping force which is proportional to the input torque; wherein the axially directed clamping force provided by the second clamping arrangement is opposite in direction to the axially directed clamping force provided by the first clamping arrangement.

The input and output structures can be connected to allow the displacement of one structure to cause displacement of the other structure, wherein the mutual displacement of the input and output structures ends when the clamping forces provided by the first and second clamping arrangements reach equilibrium.

The invention proposed here encompasses a system of a clamping Ball Ramp or ramps that use an output based ball ramp either in isolation or use both ramps, one on the input side and one on the output side. When the output ramp is employed the clamping in high gear can be arranged to be very close to the required clamping when in the overdrive (speed up) ratios but over clamped when in the underdrive (speed down) ratios. This is advantageous in particular applications where low torque states are experienced only in low gear such as a Variable Volume Super Charger where no resistance torque is possible until the turbine is spinning at high speed. When both ramps are used it is possible to arrange so that, the lowest clamping forces generated on either side becomes the actual clamping force so that excessive over-clamping is avoided across the entire ratio spread.

BRIEF DESCRIPTION OF THE DRAWINGS

Preferred embodiments of the present invention will now be described with reference to the accompanying drawings, in which.

DETAILED DESCRIPTION OF THE INVENTION

As a precursor to the present invention it is proposed to arrange a Ball Ramp on the output side of the CVT and design the ramp angle so that it provides the correct clamping for High Gear operation. In practice, it was found that this will cause over-clamping as the CVT moves to lower gears. This over clamping necessitates that the CVT is designed much heavier than a CVT with an input ramp. The over clamping in high gear caused by an input ramp affects the efficiency and life but does not necessitate a heavier design and for this reason can used in Toroidal devices.

A particular type of engine enhancement system called Variable Volume Supercharger (VVS) is being applied to internal combustion engines as a way of downsizing their swept volume but retaining a large engine performance. In this application, a Toroidal CVT is coupled to a turbine so that when the engine is running at low RPM and the driver calls for acceleration the CVT moves from a low gear to a high gear and speeds up the turbine creating boost pressure at low RPM allowing for rapid acceleration response. The CVT then backs away from high gear as the engine speed increases to avoid over revving the turbine. Known designs to date all use an input based clamping force generating ramp.

This mechanism can benefit from the use of an output based ramp system because although the output ramp "over clamps" in low gear the torque in low gear is typically very low and the over clamping never necessitates the deliberate over engineering that would be necessary in a typical CVT transmission.

However, if the CVT is used in a Turbo Compounder where exhaust gas energy is returned to the engine crankshaft (once the engine is running at a high speed) the torque is high enough to make this state the critical state when determining the component sizes. The result being a situation where the CVT in low gear is both over clamped and over stressed.

Figure 8:
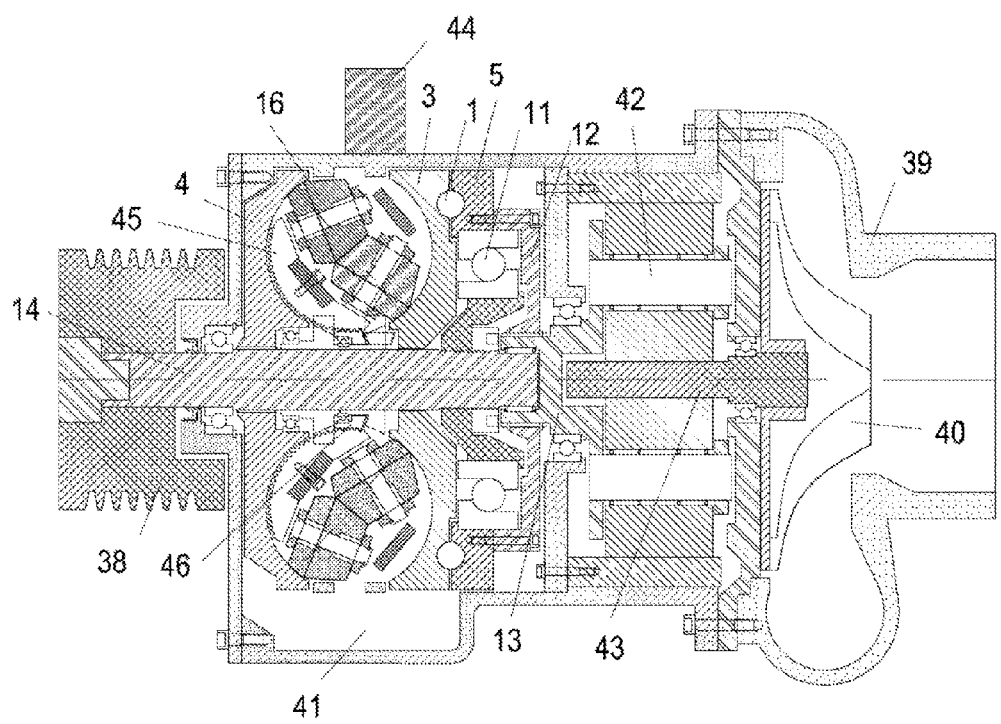
FIG. 8 is a cross-sectional view of an embodiment of the present invention applied to a single cavity double roller full toroidal variator coupled to a variable volume supercharger.

FIG. 8 depicts a section through a Variable Volume Supercharger in which a pulley 38 drives a shaft 14 that is splined to a driving toroidal disc 4 that is clamped over rollers 16 onto a driven disc 3. The pulley diameter is typically arranged to run at around double the engine speed. A ball ramp with a captured ball 1 is built into the driven disc 3 and a ramp structure 5 that drives an output disc 12 connected to an output shaft 13. The output shaft 13 drives the planet carrier of a traction drive epicyclic step-up gear set 42 that increases the speed of the shaft 43 that is connected to the turbine 40 located inside a turbine housing 39 by a typical ratio of between 10:1 and 13:1. A thrust bearing 11 is held against the back of the driven disc 3 and the shaft 14 that acts as the clamping force restraint mechanism. In this arrangement the turbine is designed to deliver compressed air to the intake manifold of an Internal Combustion engine. The sump 41 is designed to collect the traction fluid in which these devices operate.

The rollers 16 and associated carriages can be rotated by the circular rack gear 45 driven by the worm 46 so as to change the relative speeds of the Driven and Driving discs 3, 4. The worm gear is in turn driven via a pinion gear connected to a shaft driven by an electric motor 44. The section is drawn in the ratio where the driving disc 4 is speeding up the driven disc 3 and in turn the turbine 40 by a combined speed increase of around 30:1. When the rollers 16 are rotated back to low gear position the speed increase is typically 6:1.

The pressure of the air is dependent on the speed of the turbine and generally is very low at speeds below 60,000 RPM rising to 1-2 bar at speeds of 120,000 RPM. This means that when in low gear there is very little torque passing through the system and the clamping force generated by the ball ramp arrangement 1 is well below what it develops when in high gear. When in High gear the ramp arrangement 1 develops the clamping force required to ensure that no slip occurs between the discs 3, 4 and rollers 16.

A similar situation exists when applied to a kinetic energy recovery system (KERS) where energy is stored in a high speed flywheel and torque flows in both directions in and out of the flywheel. Any simple mechanical clamping system either placed on the input or output side will result in both over clamping and over stressing in some ratios.

It is also important to understand that because the clamping force created by either an input or output ramp is parallel to the discs' axis of rotation the actual "normal" force needed at the contact point to resist this is always greater in any position other than the central position. There is a "wedging" affect because of the curvature in the toroidal disc so that the actual normal force is equal to the axial force (created by the ramp) times the inverse of the COS of the angle by which the roller has been rotated.

Figure 1:
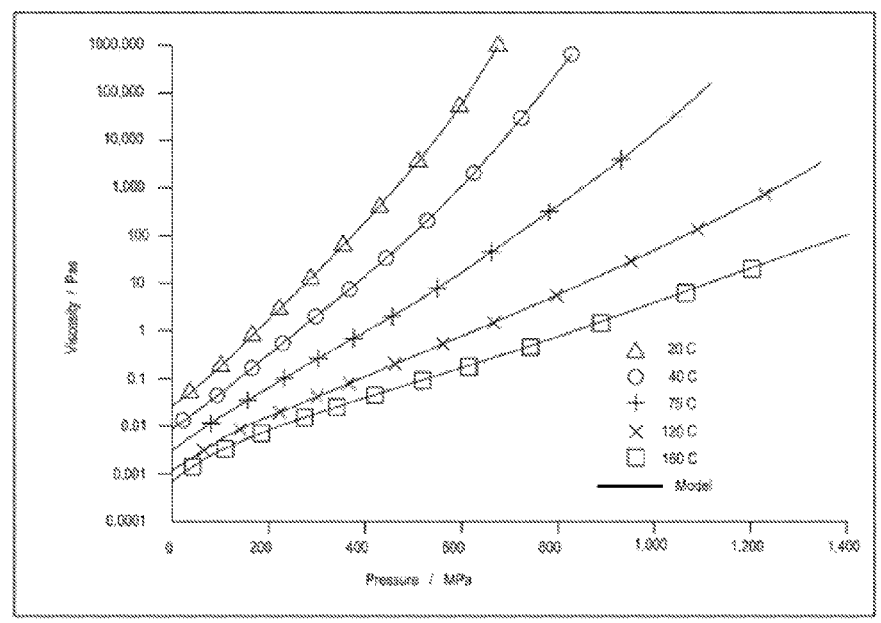
FIG. 1 is a graph showing the typical pressure and viscosity relationship of a traction fluid.
Figure 2:
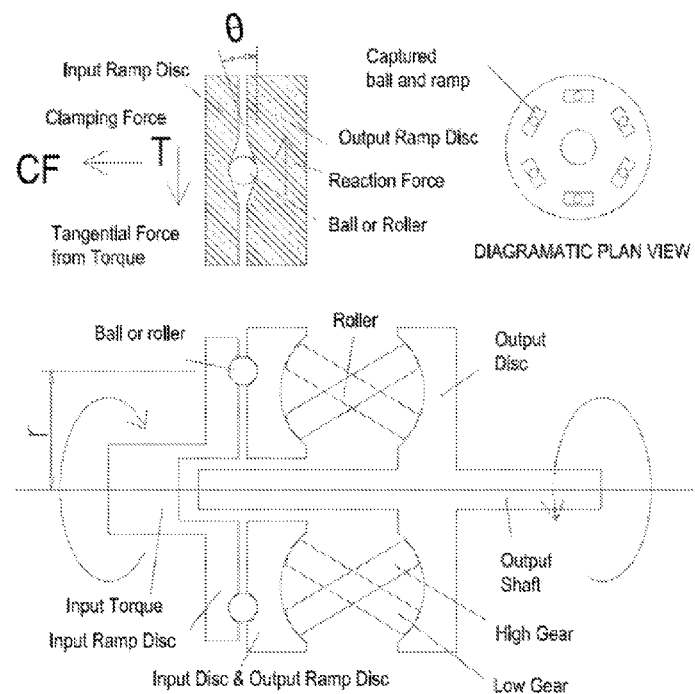
FIG. 2 illustrates a schematic of a prior art configuration of a full toroidal CVT with an input ball clamping arrangement.
Figure 3:
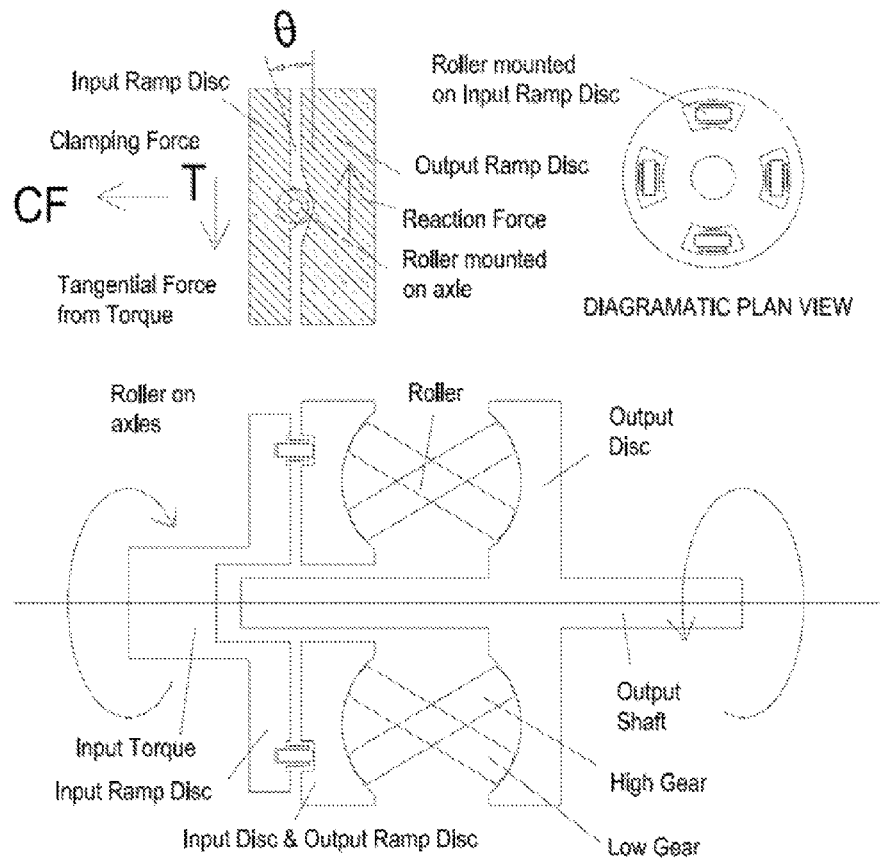
FIG. 3 illustrates a schematic of a prior art configuration of a full toroidal CVT with an input roller clamping arrangement.
Figure 4:
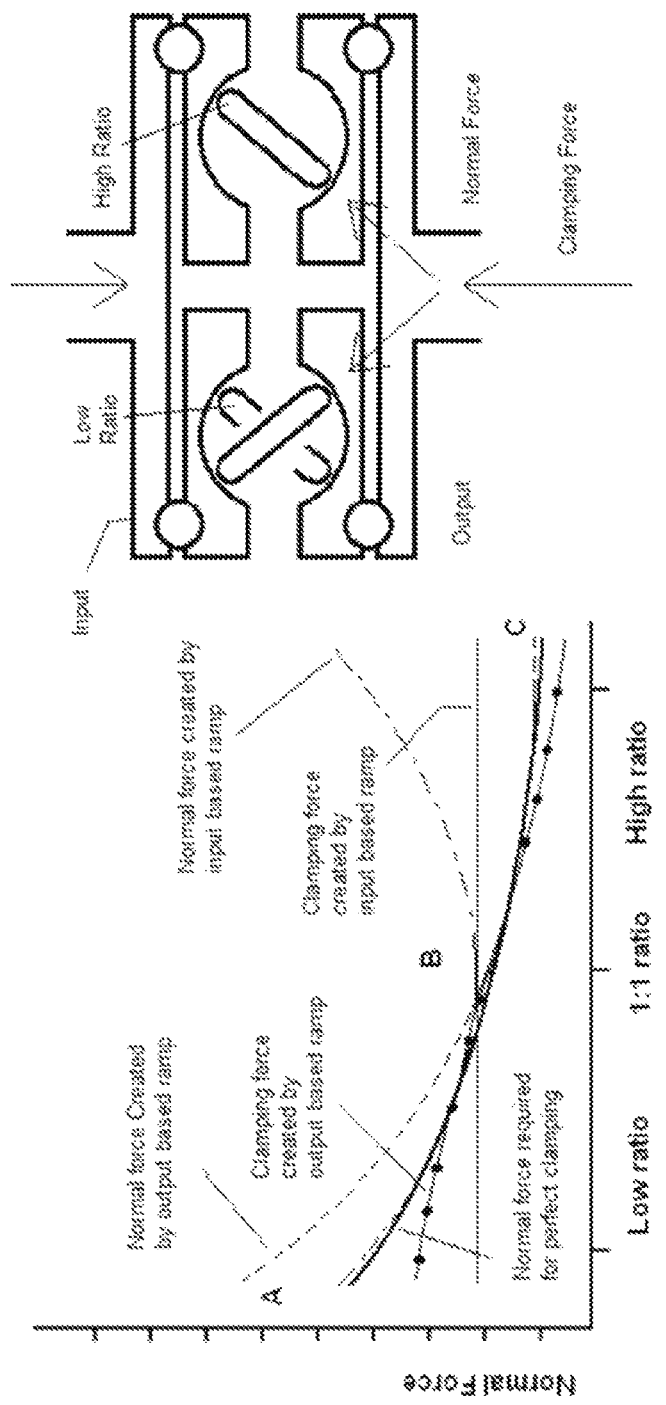
FIG. 4 shows a graph illustrating the force relationships for input and output based clamping arrangements with a schematic of such arrangements.

FIG. 4 shows the relationships of the required normal forces (at constant torque) to produce a constant relationship between the normal force and the traction force (Constant traction coefficient or "perfect clamping") and the force created by an input or output based ramp. It can be seen that the input based ramp creates over-clamping in High gear (between B and C) while the output based ramp over-clamps in low gear (between A and B).

Figure 5:
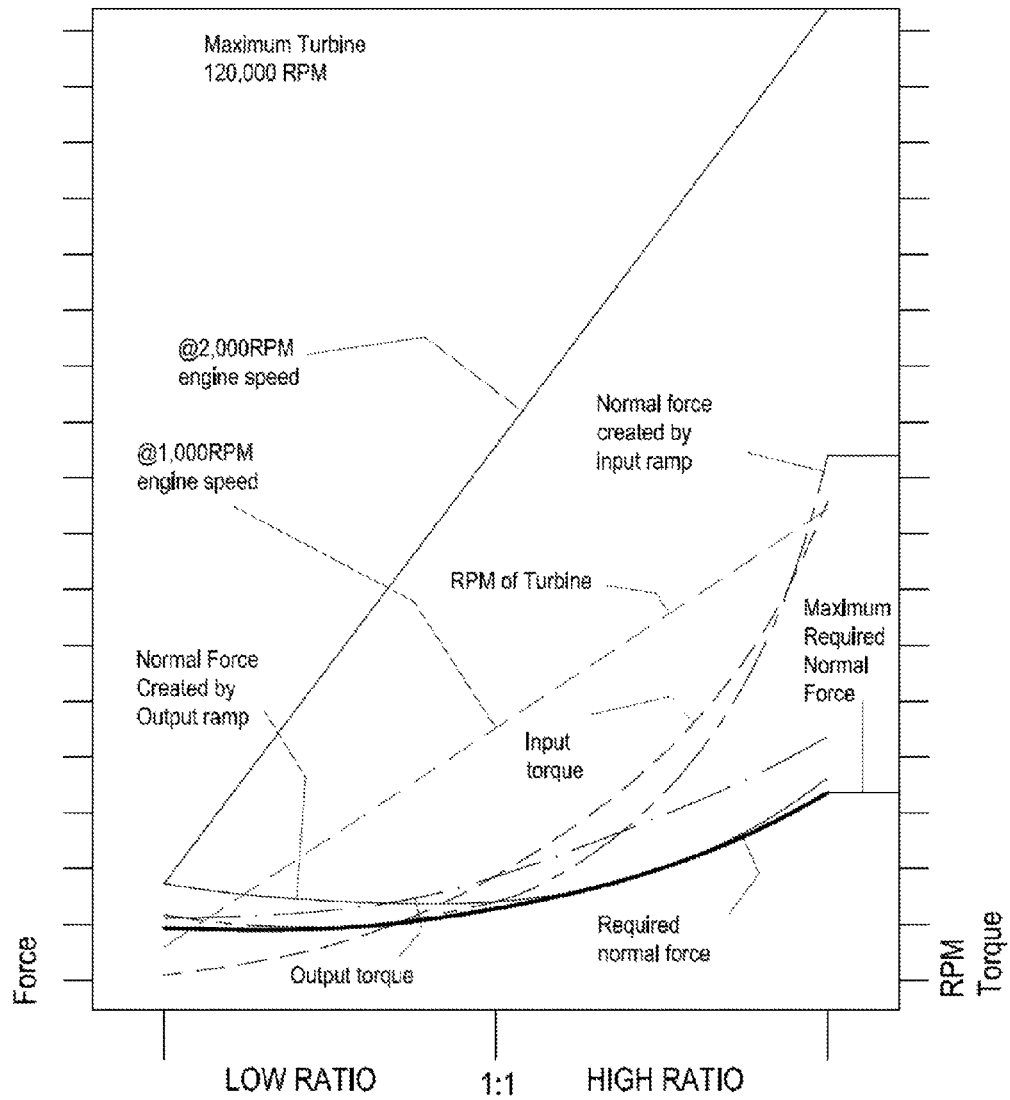
FIG. 5 shows a graph illustrating the force for input and output based clamping arrangements for a VVS mechanism operating at a speed of 2,000 rpm.

FIG. 5 shows a similar relationship for a VVS mechanism operating at an engine speed of 2,000 RPM. It can be seen that when the CVT is in low gear the turbine is running at such a low speed that very little torque is required to be inputted to the CVT. As the ratio is changed and the turbine is sped up a greater and greater amount of torque is required to be inputted with the greatest torque level reached when the CVT is in high gear. If an input based ramp is being used to control the clamping force it will create a normal force on the rollers that is much more than is necessary and in designing with this type of arrangement the rollers will need to be made larger than necessary to carry this force. The physical size of the CVT will become bigger than necessary. It can be seen that although the output based ramp creates a normal force that is greater than necessary when the CVT is in a low gear that this force is always much less than the maximum required normal force and has no effect on the design of the CVT in terms of component sizing.

Figure 6:
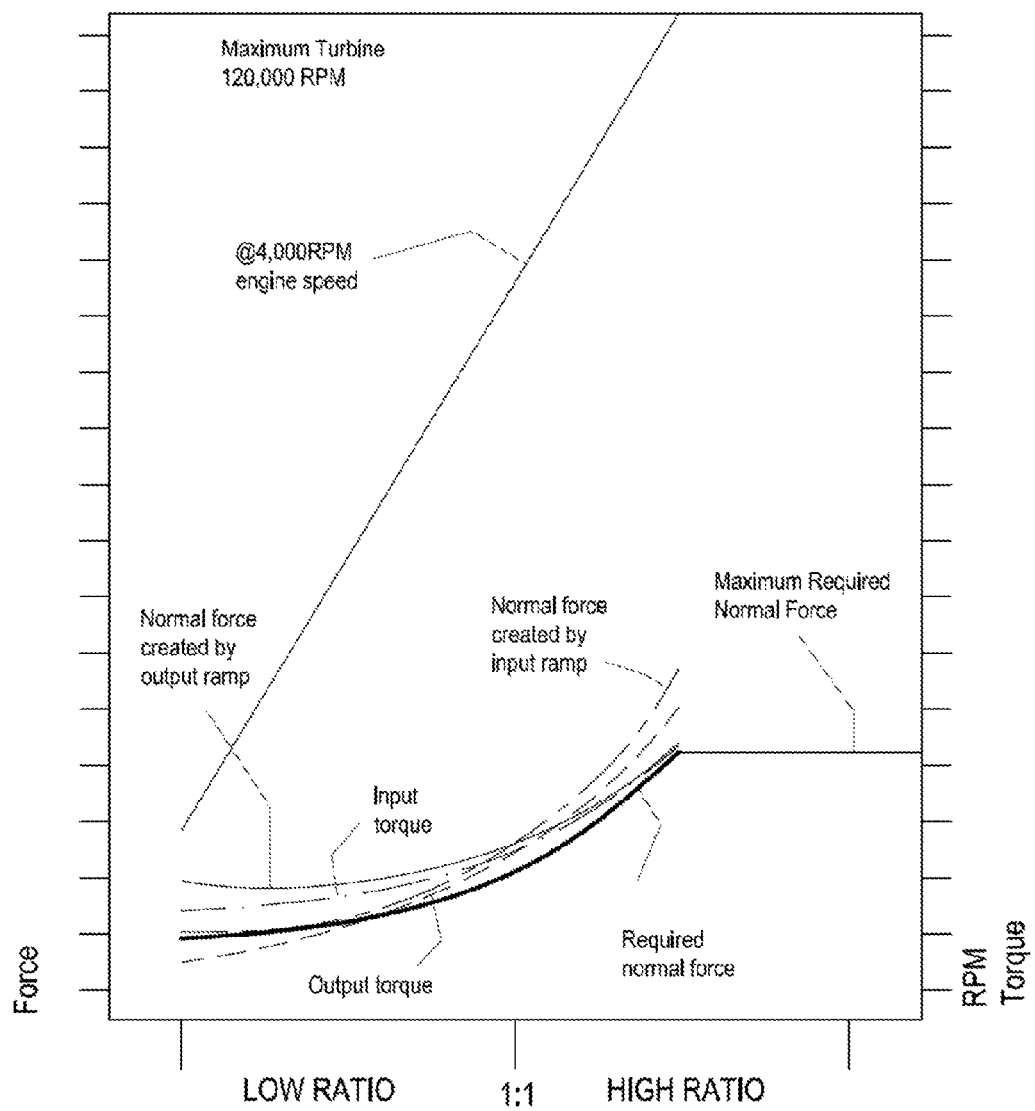
FIG. 6 shows a graph of the same arrangement as FIG. 5 operating at a speed of 4,000 rpm.

FIG. 6 shows the same VVS mechanism with the engine operating at 4,000 RPM. It is now necessary to restrict the upper level ratio of the CVT to around 1.5:1 so that the turbine does not over speed. It can be seen that the use of an output based ramp continues to keep the normal forces higher than necessary but the output based ramp remains at or below the maximum required normal force.

Figure 7:
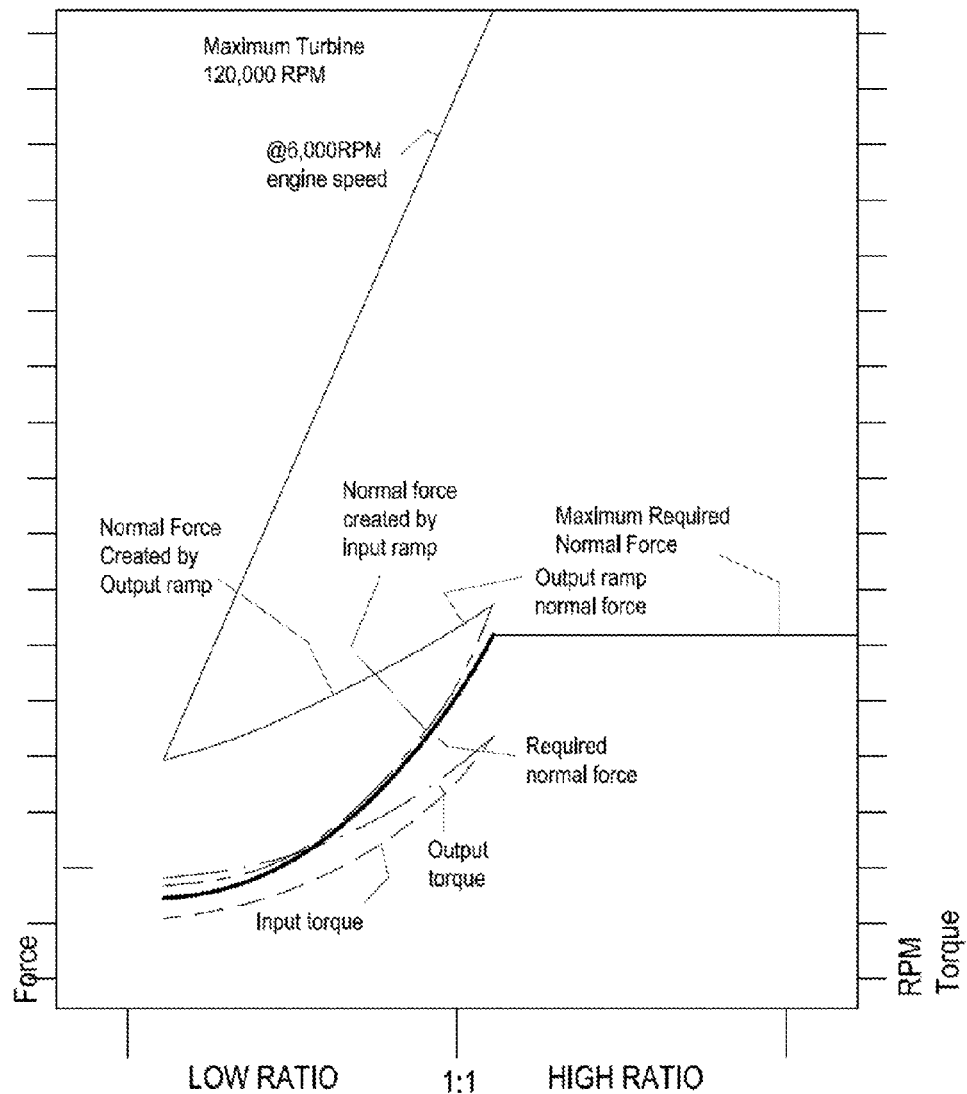
FIG. 7 shows a graph of the same arrangement as FIG. 5 operating at a speed of 6,000 rpm.

FIG. 7 shows it at an engine speed of 6,000 RPM where the CVT ratio must be restricted to below 1:1 to prevent the turbine over speeding. Again the output based ramp delivers close to the correct normal force at the 1:1 ratio and is in fact identical to it in this design. The output based ramp does over clamp the CVT more than the input ramp at this speed but again never clamps more than the maximum (ever) required normal force.

Figure 9:
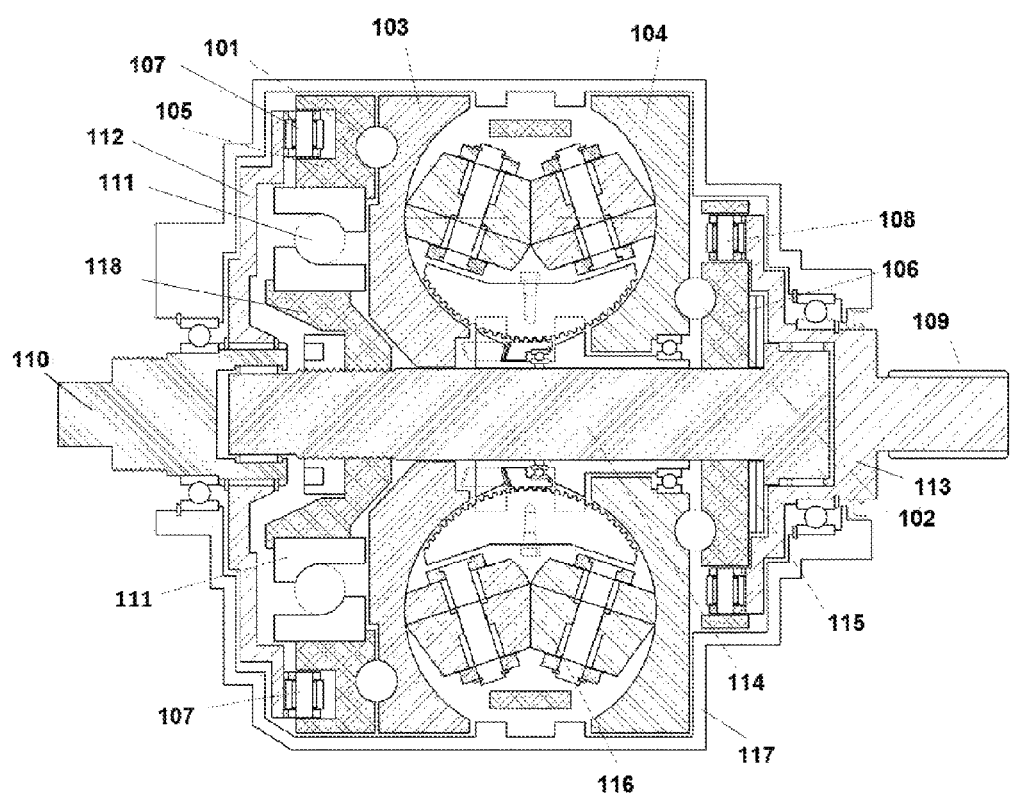
FIG. 9 is a cross-sectional view of another embodiment of the present invention applied to a double roller full toroidal variator when in a high ratio position.

Another embodiment is shown in FIG. 9.

The cross section illustrated is of a Double Roller Full Toroidal Variator or DFTV using a single cavity. A driven disc 104 is rotated by a clamping roller that is trapped inside the input ramps 102. One of these ramps is formed in the driven disc 104 and one is formed in the ramp support structure 106. The ramp support structure 106 is driven by torque fingers 108 connected to a finger support plate 113 which is driven by an input shaft 109. Preload springs 115 are loaded between the input ramp support structure 106 and the finger support plate 113. The fingers 108 can move axially inside apertures in the input ramp support structure 106 running on low friction rollers.

A clamping shaft 114 bears up on the back of the preload springs 115 and passes through the discs 103, 104 to the other side of the variator to be held onto a thrust bearing 111 by a nut 118. The thrust bearing 111 on the output side bears up against an output ramp support structure 105 which has a ramp 101 formed in its face matching a similar ramp in the driving disc 103 inside which is another trapped clamping roller. The trapped clamping rollers are ideally ball bearings, as shown. The driven disc 104 and the driving disc 103 clamp over rollers 116 providing the necessary axial force in operation to create the normal forces that are large enough but not excessively large to carry the tangential rolling contact forces.

The roller trapped within ramp 101 is driven by the driving disc 103 which drives the output ramp support structure 105 which drives torque fingers 107 which are connected to an output drive plate 112 which drives an output shaft 110.

It can be seen that when the variator is in a high gear position the torque generated at the input side is greater than that generated at the output side. The input ramp 102 is capable then of overcoming the force generated at the output and it rolls the trapped rollers along the input ramps 102 until the output ramp 101 is closed.

Figure 10:
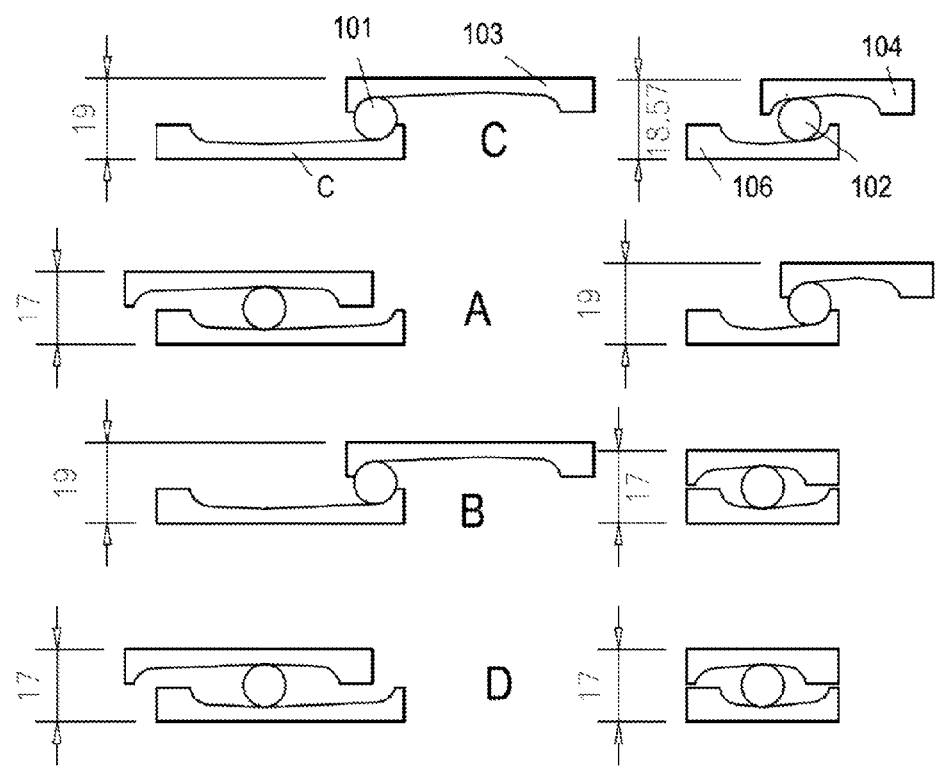
FIG. 10 represents a longitudinal section along the input and output clamping arrangements for the embodiment illustrated in FIG. 9 when in various ratio and load conditions.

This action can be seen in FIG. 10. Position A corresponds with the section shown in FIG. 9 (High Gear but carrying low torque). The force generated in the output ramp 101 is overcome by the force being generated by the input ramp 102 and the output ramp 101 is "closed" with the roller on the input side reaching a stop where it can no longer exert any greater force. The clamping force is now being generated by the output ramp 101. This particular state is one in which the input torque is great enough to overcome the preload springs 115 but not enough to cause large axial deflections in the variator itself. Consequently, the roller trapped within output ramp 101 is located towards the centre of the output ramps 101. If the input torque is increased, deflections allow the trapped roller to roll a considerable distance along the output ramp 101 and so the ramps must be long enough to accommodate this axial deflection. In this case, the design is for a typical road car transmission where the forward torques are much larger than the reverse (engine braking torque) so the input ramp 102 on the reversed torque side can be much smaller.

Position B corresponds with the variator being in low gear (see FIG. 12) where the output ramp 101 generates a higher clamping force than the input side ramp 102 and the trapped rollers shuttle to the other side with the ramp structures themselves moving a small distance X (see FIG. 12) and moving the Clamping Shaft 114 axially to the left. In diagram B of FIG. 10 the system is carrying low torque so the input ramp roller remains near the centre of the input ramp 102.

In Diagram C, the system is operating under high torque that will create deflections that allow the trapped input roller to move along the input ramp 102. The trapped roller on the output ramp 101 has moved all the way to the end-stop where it can no longer clamp to any greater degree than the input ramp roller 102.

It can be seen by now looking at the graphs in FIGS. 4 to 7 that the object of maintaining a degree of clamping that is sufficient to avoid slip, but not a great deal too much, is achieved.

The "clamping shaft" 114 with thrust bearing 111 attached can move axially a small distance if the force being generated at one of the ramps 101, 102 is greater than the other. The ramps 101, 102 themselves are built into the back of the input and output toroidal discs 103, 104 and the input ramp structure 106 and the output ramp structure 105 plates. They are formed in the shape of a flat "V" which terminates in a stop that prevents the trapped rollers from rolling any further along the slot when it reaches the end of the ramp.

FIG. 10 shows typical sections through these ramps with the trapped clamping rollers in the positions they adopt for various configurations.

Figure 11:
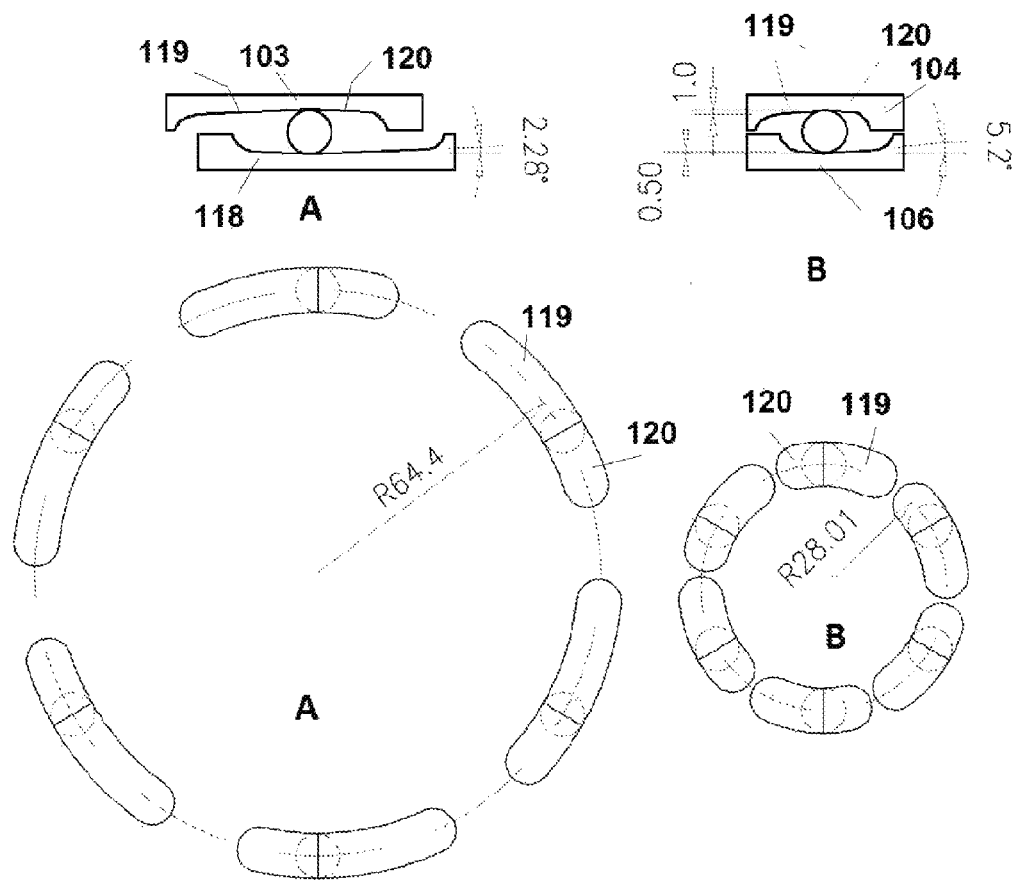
FIG. 11 represents an axial view of the input and output clamping arrangements of FIG. 9.

FIG. 11 shows a plan view and section of these ramps as they relate to the input and output ramps. The ramp angle for these ramps is set up to deliver the required clamping for either ramp that will be sufficient to ensure that the traction coefficient is always kept low enough to guarantee no gross slip. In this design the ramp angle of the Output ramp A is 2.28° and the Input ramp B 5.2°. The section through the output ramp A shows the Driving disc 103 and the output ramp structure 105 with the Input ramp made up of Driven disc 104 and Input Ramp structure 106. Each ramp has a forward torque section 119 and a reverse torque section 120. The relative size of 19 and 20 being related to the relative intensity of the maximum forward and reverse torques.

In this case the ramps are designed for a conventional transmission application where the forward torques (acceleration) are always much greater than the reverse torques (engine braking) and so one side of the ramp is longer to accommodate the greater overall deflections that occur in the forward torque state. In a mechanism, such as a Kinetic Energy Recovery System where forward and reverse torques would be more or less the same, the ramps would need to be equal lengths.

It can be seen that when one ramp is generating the greatest force the trapped ball roller will roll up the ramp to the end stop and the actual clamping force will become the lower of the two forces. In this way a very good compromise normal force is applied to the rollers 116 with little over clamping regardless of what ratio the CVT is in. This can be seen in the earlier described FIG. 4.

Figure 12:
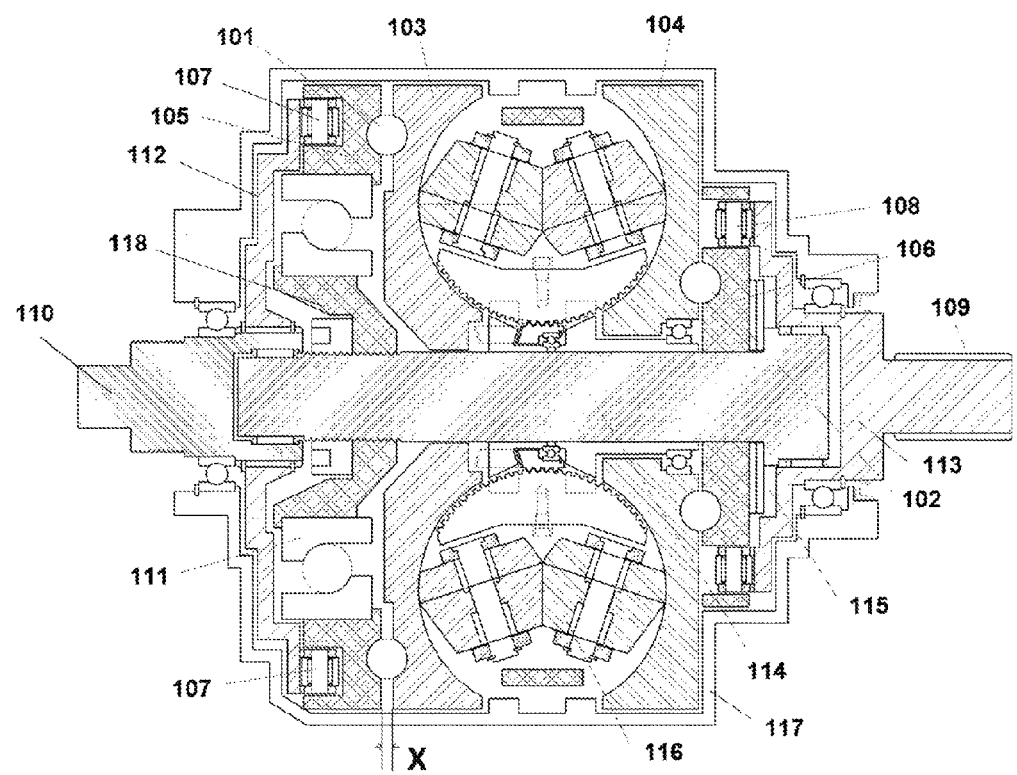
FIG. 12 illustrates the embodiment shown in FIG. 9 when in a low gear position.

FIG. 12 shows the same CVT as in FIG. 9 after it has moved to Low gear with the clamping force being generated by the input ramp 102. The Clamping Shaft 114 has moved to the left under the influence of the higher clamping force being generated on the output ramp 101. The trapped roller ball on the output ramp 101 is now hard up against the respective ramp end stop with the other trapped roller ball on the input ramp 102 being free to move and generate the input ramp clamping force.

Diagram D in FIG. 10 represents the roller ramp positions when operating under zero torque. Both trapped rollers have moved to the bottom of the ramps under the influence of the preload springs 115. The rollers roll through this position during a torque reversal when, for an instant, there is no torque. As soon as torque is generated the rollers will roll up both ramps 101, 102 and establish equilibrium when the clamping force from both ramps 101, 102 is equal.

The ramps 101, 102 can also be designed with a curved slope so that the clamping balance is established when each trapped roller is resting on a section of the ramp that allows the torque to establish equal clamping forces. A curved ramp can be used to create exactly the correct clamping force with a small degree of excessive clamping that exists with the ramp using a constant slope and a stop eliminated. It is also possible to create a hybrid of curve and stop that makes the arrangement less sensitive to deflection induced hysteresis in a way that can reduce over clamping to an even greater extent.

Figure 13:
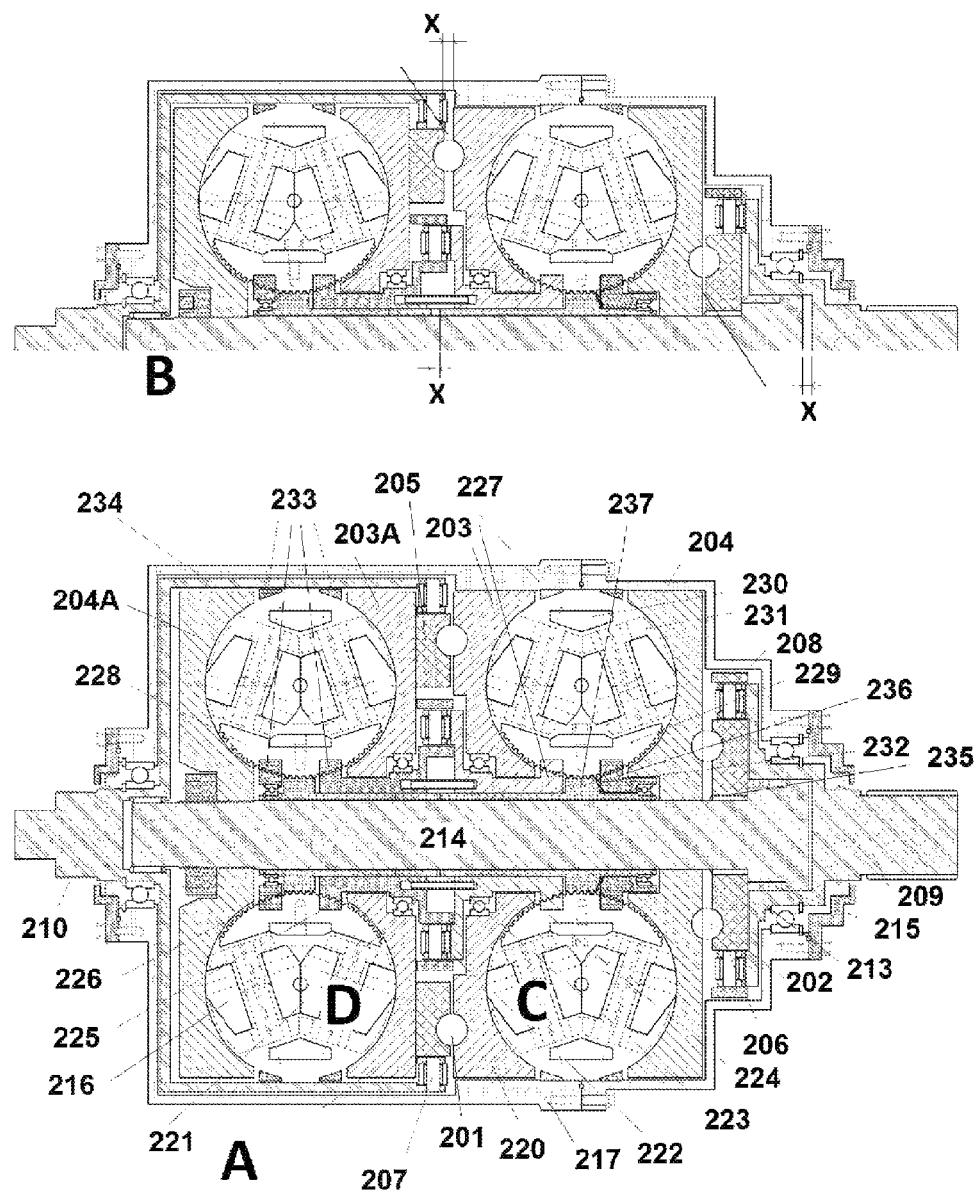
FIG. 13 shows cross-sectional views of another embodiment of the present invention applied to a double cavity, double roller full toroidal variator in high and low gear.

FIG. 13 shows the double ramp system applied to a double cavity DFTV. It can be seen that in this case the clamping shaft 214 also carries torque to a second cavity and it is necessary for the shaft 214 and the entire second cavity arrangement to move axially during a ramp "change over". The change over occurs at or near the 1:1 ratio point. Because there is no torque reaction in the torque reaction plates when at the 1:1 position, very little torque is passing the torque tube as the transition occurs.

FIG. 13A represents the section of the variator when in high gear positions with the output ramp 201 providing the clamping force and the input ramp trapped roller 202 on the stops. FIG. 13B shows the same variator in Low gear with the output ramp 201 on the ramp stop and the Input Ramp 202 providing the clamping force.

There are two driving or input discs 204 and 204A and two driving or output discs 203 and 203A that form two toroidal cavities, enclosing the rollers 216. In this double roller design the rollers 216 are supported on Yokes 231 which are connected by a swivel joint (not shown) to a trunnion 230. The Trunnions 230 are fitted with circular rack gears 228 in the second cavity and 229 in the first cavity which are driven by a worm gear 237 located in the first cavity and another 226 located in the second cavity.

The worm gear 226, 237 is driven by a pinion gear 236 connected to a shaft (not shown) driven by an electro mechanical actuator.

The trunnions 230 in the first cavity C are supported on a pair of Torque Reaction Plates 227 and the trunnions 230 in the second cavity D are supported on a similar pair of plates 233. These plates 227, 233 carry the torque reactions from the trunnions 230 which, in the 1:1 ratio, are zero in a double roller design. One of these Torque Reaction Plates in both cavities is provided with a Torque reaction Tube 224 and 225 that transfer torque from the second cavity to the first cavity through Torque Fingers 222, which include rollers on the First cavity tube that roll in an aperture built into the second cavity tube. An oil gallery sliding tube flows oil to flow from one Torque Reaction Plate to the other which provides lubrication to the rollers.

The entire assembly of second cavity D discs, reaction plates, trunnions, yokes, gears and rollers can slide axially along the Clamping Shaft 214. The worm gears are provided with a castellated sliding connection 223 that allows them to slide axially while maintaining the same rotational position relative to the Circular rack gears.

When input torque is provided to the input shaft 209 all of this torque is transferred via the input torque fingers 208 via the input torque disc 213 to apertures in the Input Ramp Structure 206. Approximately 50% of this torque is transferred to the second cavity D via a splined connection 235 between the shaft 214 and the ramp structure 206. The other 50% is transferred to the First cavity input (driven) disc 204 by the interaction of the rollers and ramps 202 such interaction also producing a clamping force that acts through the rollers 216 to the first cavity output (driving) disc 203.

The first cavity output disc 203 drives the trapped roller 201 located in the Output ramp structure 205 while providing a clamping force that reacts on the second cavity output disc 203A which clamps on the rollers 216 in the second cavity which bear up against the second cavity input disc 204A. The clamping force is transferred along the shaft 214 to counteract the force being generated in the first cavity by the trapped rollers on the input ramp 202. The output ramp structure 205 outputs torque via the torque fingers 207 to the Output Bell housing 234 which is connected to the output shaft 210. The output ramp support structure 205 is connected or even part of the second cavity output disc 203A and the 50% torque that arrives from the second cavity passes to it for collection by the output torque fingers 207.

It is important to understand that the first and second cavity will share the torque equally between themselves because small slips occur at all of the rolling contacts. The size of these slips is related to the amount of torque being passed and if one cavity is carrying more than 50% of the torque it will slip more and in consequence lose the ability to carry more than 50% of the torque.

The system can now respond to different input torques and different ratio positions as before with the clamping forces being created by half the input torque and generally being half the size of the clamping forces in a single cavity variator using this method of clamping. As the variator passes through the 1:1 position where the clamping force created at the input ramp 202 and output ramps 201 are equal the mechanism inside the second cavity will move the distance X in FIG. 13B which swaps the ramps creating the clamping maintaining optimized clamping.

It can be seen that the shaft 214 could be arranged to extend through the output shaft 210 allowing for collection of the two shaft speeds and torques for incorporation in an IVT mechanism that uses an epicyclic gear to achieve additional benefits.

The illustrated embodiments are of a Double Roller Full Toroidal Variator however it is clear that the method described in this invention could be used in other forms of Toroidal Variator including the Single Roller Full Toroidal Variator, the Single Roller Half Toroidal Variator and variators using other forms of control method including Torque Control.

It can also be seen that the double ramp arrangement could be used as a servo system using lower forces and much smaller ramps and ball rollers or sliding ramps to create a hydraulic pressure designed to provide the full clamping force. In such a system the ramps could be physically remote from each other using only the hydraulic fluid to connect them.

It will be understood by someone skilled in the art of traction based CVTs, including but not limited to toroidal, planetary, belt and chain types, that the use of a double ramp could be used in many ways to control clamping forces so as to improve efficiency, power density or life of the mechanism.

The invention claimed is:

1. A toroidal variable speed traction drive comprising:
    a driving toroidal disc assembly and a driven toroidal disc assembly, said driving toroidal disc assembly and said driven toroidal disc assembly having a common axis of rotation;
    a plurality of roller assemblies interposed between said driving toroidal disc and said driven toroidal disc, each roller assembly comprising at least one roller;
    wherein said toroidal discs are urged together against the interposed roller assemblies by an axially directed clamping force, wherein each roller of each roller assembly contacts the driving toroidal disc and the driven toroidal disc at respective contact points so as to define gear ratios between the driving toroidal disc assembly and said driven toroidal disc assembly, said gear ratios comprising higher gear ratios and lower gear ratios;
    the driving toroidal disc assembly being driven by an input drive shaft which provides an input torque;
    the driven toroidal disc driving an output structure that rotates around the common axis of rotation, said output structure driving an output shaft; wherein an interposed ball ramp clamping arrangement is provided between said driven toroidal disc and said output structure, said interposed ball ramp clamping arrangement providing the axially directed clamping force, the axially directed clamping force being proportional to an output torque experienced by said output shaft such that when the toroidal variable speed traction drive is at one of the higher gear ratios the clamping force is sufficient to prevent slippage between the driving toroidal disc assembly and the driven toroidal disc assembly, and when the toroidal variable speed traction drive is at one of the lower gear ratios the clamping force is substantially greater than necessary to prevent slippage between the driving toroidal disc assembly and the driven toroidal disc assembly for a then prevailing input torque.

2. The toroidal variable speed traction drive according to claim 1, wherein said output shaft is connected to a turbine designed to compress a gas.

3. The toroidal variable speed traction drive according to claim 1, wherein said interposed clamping arrangement comprises a plurality of clamping rollers, each clamping roller being arranged in respective indentations of varying depth formed on the driven toroidal disc.

4. The toroidal variable speed traction drive according to claim 3, wherein the amount of clamping force provided by said clamping arrangement depends upon the depth of the instant position of the clamping roller along the respective indentation, wherein minimum depth provides maximum clamping force and maximum depth provides minimum clamping force.

5. The toroidal variable speed traction drive according to claim 3, wherein each indentation forms a ramp-like formation between a point of minimum depth at an end of the formation to a point of maximum depth along the length of the indentation.

6. The toroidal variable speed traction drive according to claim 5, wherein the ramp-like formation provides increasing or decreasing angle of inclination from the point of maximum depth to the point of minimum depth.

7. The toroidal variable speed traction drive according to claim 5, wherein each indentation forms a second ramp-like formation between a second point of minimum depth at an opposite end of the formation to the point of maximum depth.

8. The toroidal variable speed traction drive according to claim 7, wherein the first and second ramp-like formations are of unequal lengths.

9. The toroidal variable speed traction drive according to claim 3, wherein each clamping roller is in the form selected from the set comprising a ball, a cylindrical roller or a patered roller.

10. The toroidal variable speed traction drive according claim 3, wherein the indentations have stop formations at each end to prevent the respective clamping roller travelling past said stop formations.

11. The toroidal variable speed traction drive according to claim 1, wherein said driving toroidal disc is indirectly driven by said input drive shaft.

12. The toroidal variable speed traction drive of claim 11, wherein said driving toroidal disc assembly is driven by an input structure that rotates around the common axis of rotation, said input structure being driven by said input drive shaft; wherein a second interposed clamping arrangement is provided between said driving toroidal disc and said input structure, said second interposed clamping arrangement providing an axially directed clamping force which is proportional to said input torque; wherein the axially directed clamping force provided by said second clamping arrangement is opposite in direction to the axially directed clamping force provided by said first clamping arrangement.

13. The toroidal variable speed traction drive of claim 12, wherein said second interposed clamping arrangement comprises a plurality of clamping rollers, each clamping roller is arranged in respective indentations of varying depth formed on the driving toroidal disc, on the opposite side of the toroidal cavity, and the input structure.

14. The toroidal variable speed drive according to claim 12, wherein said input and output structures are each displaceable along the axial direction.

15. The toroidal variable speed drive according to claim 14, wherein said input and output structures are connected to allow the displacement of one structure to cause displacement of the other structure, wherein the mutual displacement of the input and output structures ends when the clamping forces provided by said first and second clamping arrangements reach equilibrium.

16. A toroidal variable speed traction drive comprising:
a driving toroidal disc assembly and a driven toroidal disc assembly, said driving toroidal disc assembly and said driven toroidal disc assembly having a common axis of rotation;
a plurality of roller assemblies interposed between said driving toroidal disc and said driven toroidal disc, each roller assembly comprising at least one roller; wherein said driving toroidal disc and said driven toroidal disc are urged together against the interposed roller assemblies by a first axially directed clamping force, wherein each roller of each roller assembly contacts the driving toroidal disc and the driven toroidal disc at respective contact points;
the driving toroidal disc assembly being driven by an input drive shaft which provides an input torque;
the driven toroidal disc driving an output structure that rotates around the common axis of rotation, said output structure driving an output shaft; wherein a first interposed ball ramp clamping arrangement is provided between said driven toroidal disc and said output structure, said first interposed ball ramp clamping arrangement providing the first axially directed clamping force, the first axially directed clamping force being proportional to an output torque experienced by said output shaft;
wherein said driving toroidal disc is indirectly driven by said input drive shaft;
wherein said driving toroidal disc assembly is driven by an input structure that rotates around the common axis of rotation, said input structure being driven by said input drive shaft;
wherein a second interposed clamping arrangement is provided between said driving toroidal disc and said input structure, said second interposed clamping arrangement providing a second axially directed clamping force which is proportional to said input torque; and
wherein the second axially directed clamping force provided by said second clamping arrangement is opposite in direction to the first axially directed clamping torque provided by said first clamping arrangement.

17. The toroidal variable speed traction drive of claim 16, wherein said second interposed clamping arrangement comprises a plurality of clamping rollers, each clamping roller is arranged in respective indentations of varying depth formed on the driving toroidal disc, on the opposite side of the toroidal cavity, and the input structure.

18. The toroidal variable speed drive according to claim 16, wherein said input and output structure are each displaceable along the axial direction.

19. The toroidal variable speed drive according to claim 18, wherein said input and output structures are connected to allow the displacement of one structure to cause displacement of the other structure, wherein the mutual displacement of the input and output structures ends when the first and second clamping forces provided by said first and second clamping arrangements reach equilibrium.

* * * * *